United States Patent
Millius et al.

(10) Patent No.: US 11,138,384 B2
(45) Date of Patent: Oct. 5, 2021

(54) ADAPTIVE NATURAL LANGUAGE STEGANOGRAPHY AND WATERMARKING FOR VIRTUAL ASSISTANTS

(71) Applicant: Google LLC, Mountain View, CA (US)

(72) Inventors: Sebastian Millius, Zürich (CH); Sandro Feuz, Zürich (CH)

(73) Assignee: GOOGLE LLC, Mountain View, CA (US)

( * ) Notice: Subject to any disclaimer, the term of this patent is extended or adjusted under 35 U.S.C. 154(b) by 116 days.

(21) Appl. No.: 16/662,755

(22) Filed: Oct. 24, 2019

(65) Prior Publication Data

US 2020/0134022 A1 Apr. 30, 2020

Related U.S. Application Data

(63) Continuation of application No. PCT/US2019/015414, filed on Jan. 28, 2019.
(Continued)

(51) Int. Cl.
*G10L 15/18* (2013.01)
*G10L 15/22* (2006.01)
*G06F 40/30* (2020.01)

(52) U.S. Cl.
CPC .......... *G06F 40/30* (2020.01); *G10L 15/1815* (2013.01); *G10L 15/22* (2013.01); *G10L 2015/223* (2013.01)

(58) Field of Classification Search
CPC ......... G10L 13/02; G10L 13/08; G10L 15/18; G10L 15/20; G10L 15/1815; G10L 15/22;
(Continued)

(56) References Cited

U.S. PATENT DOCUMENTS 8,589,148 B2 * 11/2013 Atallah ................. G06F 40/211
704/9
8,725,818 B1 5/2014 Covitz
(Continued)

FOREIGN PATENT DOCUMENTS

CA 2649011 10/2007

OTHER PUBLICATIONS

Bergmair et al., "Towards human interactive proofs in the text-domain," International Conference on Information Security, Sep. 2004, 12 pages.
(Continued)

*Primary Examiner* — Martin Lerner
(74) *Attorney, Agent, or Firm* — Middleton Reutlinger (57) ABSTRACT

Methods, systems, and apparatus, including computer programs encoded on computer storage media, for announcing and detecting automated conversation are disclosed. One of the methods includes initiating, over a natural language communication channel, a conversation with a communication participant using a natural language communication method that includes a dialogue of natural language communications. The communication participant is determined to be automated using a pre-defined adaptive interactive protocol that specifies natural language linguistic transformations defined in a sequence. The conversation can be transitioned to a communication method that is different form the natural language communication method in response to determining that the communication participant is automated.

20 Claims, 5 Drawing Sheets

Related U.S. Application Data (60) Provisional application No. 62/751,172, filed on Oct. 26, 2018.

(58) Field of Classification Search
CPC ...... G06F 40/20; G06F 40/237; G06F 40/247; G06F 40/30; H04L 51/02
USPC .............. 704/1, 9, 10, 257, 270, 270.1, 275
See application file for complete search history.

(56) References Cited

U.S. PATENT DOCUMENTS

| | | | | |
|---|---|---|---|---|
| 8,996,635 | B1* | 3/2015 | Byttow | G06Q 10/10 709/206 |
| 9,595,034 | B2* | 3/2017 | Van Rooyen | G06F 21/10 |
| 10,108,605 | B1* | 10/2018 | Leighton | G06F 40/205 |
| 10,466,885 | B2* | 11/2019 | Yaseen | G06F 40/30 |
| 10,721,356 | B2* | 7/2020 | Segalis | G10L 15/005 |
| 10,971,144 | B2* | 4/2021 | Mahajan | G10L 15/22 |
| 2008/0147406 | A1* | 6/2008 | Da Palma | G10L 15/22 704/260 |
| 2014/0032220 | A1* | 1/2014 | Lerner | G10L 17/24 704/273 |
| 2017/0324867 | A1* | 11/2017 | Tamblyn | H04L 51/24 |
| 2019/0287513 | A1* | 9/2019 | Alameh | G10L 13/033 |
| 2020/0082816 | A1* | 3/2020 | Mahajan | G10L 15/30 |

OTHER PUBLICATIONS

PCT International Search Report and Written Opinion in International Appln. No. PCT/US2019/01541, dated Jul. 11, 2019, 16 pages.

phrasee.com [online], "How to tell if you are talking to a chatbot," Jul. 2017, retrieved on Jul. 3, 2019, retrieved from URL<https://phrasee.co/how-to-tell-if-you-are-talking-to-a-chatbot/>, 10 pages.

talkspace.com [online], "How to Tell If You're Talking to a Bot: The Complete Guide to Chatbots," available on or before Jan. 2016, via Internet Archive: Wayback Machine URL <http://web.archive.org/web/20160125115828/https://www.talkspace.com/blog/2016/01/how-to-tell-if-youre-talking-to-a-bot-the-completeguide-to-chatbots/>, retrieved on Jul. 9, 2018, URL<https://www.talkspace.com/blog/how-to-tell-if-youre-talking-to-a-bot-the-complete-guide-to-chatbots/>, 10 pages.

* cited by examiner

ADAPTIVE NATURAL LANGUAGE STEGANOGRAPHY AND WATERMARKING FOR VIRTUAL ASSISTANTS

CROSS-REFERENCE TO RELATED APPLICATIONS

This application claims the benefit of U.S. Application No. 62/751,172, filed Oct. 26, 2018 and is a continuation of International Application No. PCT/US2019/015414, filed Jan. 28, 2019, which claims the benefit of U.S. Application No. 62/751,172, filed Oct. 26, 2018. The contents of the prior applications are incorporated by reference.

BACKGROUND

This specification relates to natural language processing to detect fully automated conversations.

A virtual assistant, or a chatbot, is an application that understands natural language voice commands and completes tasks for a user that requires communication with another participant. In order to complete these tasks, the virtual assistant can be programmed to perform natural language conversations, e.g., make phone calls or engage in text message or chat conversations, on behalf of users.

SUMMARY

This specification describes technologies for detecting fully-automated conversations using adaptive natural language steganography and watermarking. These technologies generally involve an interactive protocol to surreptitiously announce and detect that both participants in a conversation are automated without a human user being able to determine that detection is taking place. After detecting that both sides of the conversation are automated, an example automation detection system changes the communication method of the conversation to an efficient communication method for automated communication participants.

In general, one innovative aspect of the subject matter described in this specification can be embodied in methods that include the actions of initiating, over a natural language communication channel, a conversation with a communication participant using a natural language communication method that includes a dialogue of natural language communications, determining that the communication participant is automated using a pre-defined adaptive interactive protocol that specifies a plurality of natural language linguistic transformations for the dialogue of natural language communications, and in response to determining that the communication participant is automated, transitioning the conversation to a communication method that is different from the natural language communication method with which the conversation was initiated.

Other embodiments of this aspect include corresponding computer systems, apparatus, computer program products (software products), and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination.

The subject matter described in this specification can be implemented in particular embodiments so as to realize one or more of the following advantages.

An example automation detection system provides an interactive watermarking and steganography protocol to announce and detect automated conversations. Subtle audio marking for the purpose of automation detection is hard and expensive to do since most conversations with automated systems, e.g., virtual assistants, are over text, either directly by the user entering text, or using text generated by speech-to-text conversion. In the case that user speech is recorded using microphone(s), data used to generate the audio marking may be masked by noise picked up by the microphones at a lower sampling rate. For that reason, the present system performs automated detection using a surreptitious adaptive interactive protocol that ensures that human-machine interaction quality does not suffer. In fact, the system subtly determines whether the other side of a conversation is an automated device, e.g., virtual assistant, using images, audio, or text, without making the conversation awkward for human interactors.

For virtual assistants or bots, communicating over natural language or natural language text is sub-optimal and less efficient than communicating over a machine communication protocol. Furthermore, natural language communication is error-prone since automated systems can misinterpret or misunderstand natural language when performing natural language processing.

Therefore, once the system detects automated conversation, the system can switch the automated conversation to a communication protocol that is more efficient than natural language. Additionally, by knowing that both participants are bots, the system can perform different tasks that automated virtual assistants can easily perform, but the system would not attempt if either communication participant was a human. For instance, when verifying authenticity of a caller if both communication participants are automated from a same system, the virtual assistants may be able to verify a shared secret, e.g., a public or private key. If the communication has a human participant, the human participant could not be expected to read out and be able to verify a user's public key.

The system is further advantageous because it uses a natural-text based approach that is easy to plug into existing systems and can work with a variety of text-to-speech systems since it is system-independent.

The system is further advantageous because it may be robust to noise or signal degradation in the natural communication channel (for example, due to inadvertent signal pick-up from other communication channels). For example, unlike a conventional stenography system which encodes data in a certain inaudible frequency range, and is therefore susceptible to noise in that range, encoding data by means of transformed natural language communications will not be degraded provided that channel transmits the transformed natural language communications sufficiently accurately for them to be comprehensible. Thus, the present system exploits the power of known chatbot systems to overcome the limitations of natural communication channels.

An alternative expression of the disclosure is a method for automated conversation detection between a plurality of communication participants, the method comprising one of the communication participants initiating, over a natural language communication channel, a conversation with another of the communication participants using a natural language communication method that includes a dialogue of natural language communications, a first of the communication participants at least once generating a natural language communication of the dialogue, transforming the natural language communication based a pre-defined adaptive interactive protocol that specifies a plurality of natural language linguistic transformations, and transmitting the transformed natural language communication over the natural language communication channel, and another of the communication participants receiving one or more said transformed natural language communications over the natural language communication channel, determining from the one or more said transformed natural language communications using the pre-defined adaptive interactive protocol that the first communication participant is automated, and in response to determining that the communication participant is automated, transitioning the conversation to a communication method that is different from the natural language communication method with which the conversation was initiated.

Each of the communication participants, in the case that it is automated, may be operative both to generate and transmit transformed natural language communications, and to determine from received natural language communication(s) that another communication participant is automated and transition the conversation. However, in principle, one of the communication participants may be operative to generate and transmit transformed natural language communications but not necessarily to perform the determination that the other communication participant is automated or to transition the conversation; while a second of the communication participants may be operative to determine that another communication participant is automated and to transition the conversation, but not necessarily to generate and transmit transformed natural language communications.

Thus, another expression of the disclosure is a method performed by an automated communication participant in a natural language dialogue over a natural language communication channel, comprising at least once generating a natural language communication of the natural language dialogue, transforming the natural language communication based a pre-defined adaptive interactive protocol that specifies a plurality of natural language linguistic transformations, and transmitting the transformed natural language communication over the natural language communication channel.

A further expression of the disclosure is a method performed by a first automated communication participant in a natural language dialogue with a second communication participant by a natural language communication method and over a natural language communication channel, comprising receiving one or more said natural language communications of the dialogue from the second communication participant over the natural language communication channel, comparing said received natural language communications to a pre-defined adaptive interactive protocol, and thereby determining that the second communication participant is automated, and in response to determining that the second communication participant is automated, transitioning the conversation to a communication method that is different from the natural language communication method.

The expression "natural language communication method" means a communication method using a human language, composed of individual communications which are consistent with the rules of the human language. Examples of natural language communication methods include text and spoken communication methods. The expression "natural language linguistic transformation" means a transformation which transforms a first natural language communication into a second natural language communication, such that the two natural language communications are different, but both are consistent with the same natural language communication method (i.e. conform to the rules of the same human language) and both contain the same information about the subject of the dialogue.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The present disclosure describes a technology that allows an automated or semi-automated assistant, referred to herein as a virtual assistant or "bot," to communicate with people and other automated assistants. With the increase of automated assistants that can perform tasks for users and the capabilities of such assistants, natural language conversations can take place between two automated assistants without any human interaction.

An automated assistant, e.g., a virtual assistant, or bot, receives and monitors input to detect trigger events that indicate a conversation should be initiated. The automated assistant executes predefined workflows, or sequences of repeatable patterns of operations, each linked by abstract descriptions of operations to be performed, or intents. Essentially, the virtual assistant is able to use these workflows to determine how to react and what to say in order to perform a task for a user. These tasks can include booking a haircut for the user, making a reservation, ordering food, finding a dog walker, figuring out which store has an item that the user would like to purchase, or hiring a repair person to perform service.

When initiating a natural language conversation, e.g., calling a business, the virtual assistant often does not know whether the other participant in the conversation is a person or an automated virtual assistant. In instances where the other participant is a person, the virtual assistant maintains a natural language conversation throughout an interaction to allow the interaction to appear natural to the human user. However, when both sides of a conversation are automated, the conversation can be more efficient if the virtual assistants communicate using a communication method other than natural language. Even so, it is awkward for human users to have a conversation interrupted by an automated system trying to determine whether the system is communicating with another automated system or a human user. Additionally, human users may not want to engage with an automated bot. Therefore the automated detection system of the present disclosure uses an adaptive interactive protocol to subtly determine whether conversation participants are automated assistants.

In order to optimize communication between two automated assistants, the automated assistants must recognize one another as automated and transition from natural language communication to a different communication method that is more efficient for automated assistants, e.g., structured data communication methods.

The automation detection system of this specification provides an approach to determine automation of conversation participants that is unobtrusive to the conversation and does not require the automated assistants to explicitly disclose that a participant of the conversation is automated before every interaction.

Figure 1:
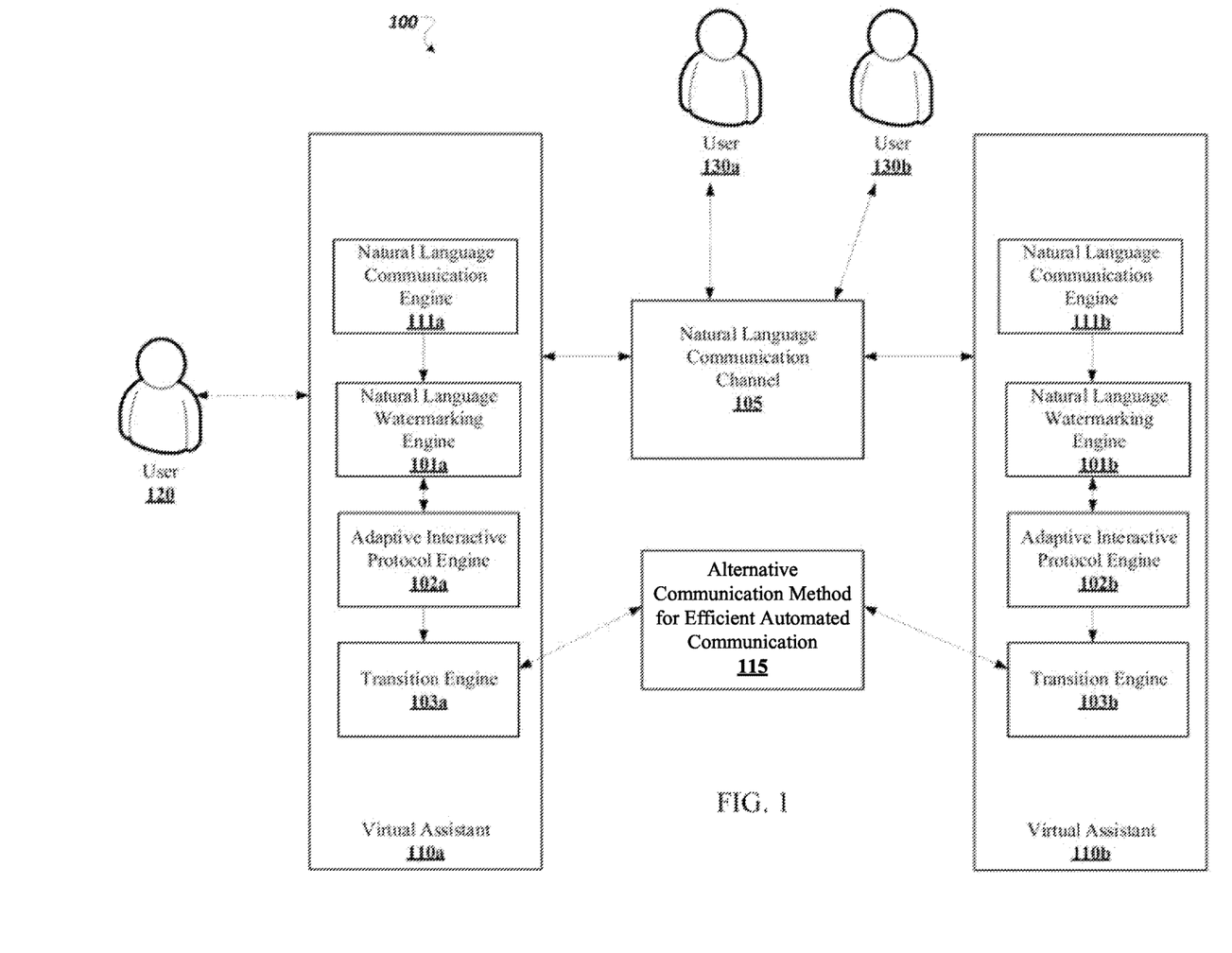
FIG. 1 illustrates an example automation detection system that detects automated conversation participants in a surreptitious, unobtrusive manner.

FIG. 1 shows an example automation detection system 100 that detects automated conversation participants in a surreptitious, unobtrusive manner. The system 100 can be implemented as computer programs on one or more computers in one or more locations, in which the systems, components, and techniques described below can be implemented.

As illustrated, the automation detection system 100 includes a user, e.g., user 120, that tasks an originating automated assistant, e.g., virtual assistant 110a, with performing a task for the user. The task may require the virtual assistant to communicate with another participant. Details of how an automated assistant receives a task, initiates a communication, and determines appropriate communication time, and natural language communications can be found in U.S. Pat. No. 10,721,356 issued 21 Jul. 2020, which is incorporated by reference. For example, automated assistants can handle various tasks such as "book a table for two at Yves Saint Thomas Restaurant for Thursday," or "my sink is leaking, please find me a plumber! It's after 10 pm!" A communication platform allows assistants to contact external actors by performing tasks such as placing calls, receiving inbound calls from businesses or users, or contacting target businesses. The communication platform also allows an assistant to receive requests from a user to make calls on the user's behalf. A task manager module may determine when to schedule calls to people or businesses. The task manager module monitors tasks from a task information storage and determines the appropriate time to schedule received tasks. A dialer facilitates initiating, or placing, calls that the assistant conducts. The dialer may be communicably connected to the communications platform to initiate a phone call to a particular callee selected by the dialer. Once the call is placed, the assistant can conduct a conversation with the communication participant on the other end of the line.

The automated assistant, e.g., virtual assistant 110a, may be on a separate device and located remotely from a communication participant, e.g., user 130a, user 130b, or virtual assistant 110b. Virtual assistant 110a initiates communication with another participant over a network, e.g., the Internet, using a natural language communication method over a natural language communication channel.

In some instances, a user, e.g., user 120, tasks the automated assistant, e.g., virtual assistant 110a, with performing an action by uttering a command. For example, the user may utter, "Please make me a haircut appointment."

In other instances, a user can task the automated assistant using text-based commands that are received by the automated assistant and acted upon.

The automated assistant, e.g., virtual assistant 110a, uses a natural language communication engine, e.g., natural language communication engine 111a, to determine the natural language communications, either audible or text-based, needed to complete the task. Each interaction with a communication participant may change the communication required from the virtual assistant. For example, if an automated assistant is trying to make a haircut appointment for Tuesday and the communication participant on the other side of the communication says that there are no appointments available on Tuesday, the automated system must determine an appropriate response to continue making the haircut appointment for a different day.

Once the assistant determines at least one natural language communication to send to a communication participant, the assistant 110a uses an adaptive interactive protocol engine 102a to determine how to transform the natural language communication in order to provide information that the originator of the conversation, i.e., virtual assistant 110a, is an automated assistant in a discreet manner so that the information is imperceptible to a human communication participant, but can be determined by an automated communication participant.

The adaptive interactive protocol engine 102a has a pre-defined adaptive interactive protocol that defines a sequence of natural language transformations which act as natural language watermarks and steganography to transform the natural language communication text. The natural language watermarks and steganography can include standard watermark and steganography techniques. In some instances, watermarks may be embedded into images of text so that they are not noticeable to a human eye. In other instances, audio may be embedded into audio utterances of an automated assistant at frequencies that are not easy for the human ear to pick up. In still other instances, the automated assistant can present written or spoken text that includes changes in position or structure of text.

One technique for transforming natural language output is passivization. Passivization is the transformation of a sentence from an active form to a passive form. A second transformation technique may be topicalization. Topicalization is a mechanism of syntax that establishes an expression as the sentence or clause topic by having the expression at the front of the sentence or clause. The assistant may also use clefting and construct a sentence using it+a conjugated form of to be+the part of the sentence that should have focus+a subordinate clause. Another example of a text transformation is extraposition. Extraposition means to place a word or group of words outside or at the end of a clause, while still retaining the sense of the sentence. Preposing is another technique that can be used by the assistant to transform the text. Preposing is placing an element or word in front of another. The interactive protocol can also include a reference to there-construction, in which the transformation includes adding the word "there" to the text and rearranging text to make a sentence that makes sense. Pronominalization may also be used to transform the text.

Pronomilization replaces lexical items with a pronoun. An automated assistant may also front text with filler words such as "umm," "aha," and "hmm." In some embodiments, the interactive protocol can use substitutes for words according to specific rules. For instance, the interactive protocol may have a pre-defined list of synonyms and choose a synonym from the list based on the position of the word in a statement. This list of transformations is not exhaustive. Any text-based transformations can be used in the interactive protocol.

The automated assistant, virtual assistant 110a, determines natural language communications to send from the natural language communication engine 111a. The virtual assistant 110a then uses the adaptive interactive protocol engine 102a to determine the appropriate transformation to perform on the natural language communication based on the adaptive interactive protocol. A natural language watermarking engine 101a will then perform the appropriate transformation and the virtual assistant 110a will send the transformed communication to a communication participant, e.g., user 130a, user 130b, or virtual assistant 110b, using a natural language communication method over a natural language communication channel 105.

As part of the dialogue, the virtual assistant 110a also receives communications from the other communication participant. The virtual assistant 110a classifies the communication participant as an automated assistant when the response from the communication participant is in an expected form according to the pre-defined adaptive interactive protocol. In some instances, the adaptive interactive protocol engine 102a classifies the communication participant.

If the communication response that the virtual assistant 110a receives is not in the expected form, the automated assistant classifies the communication participant as a human user.

In some instances, the automated detection system 100 performs several rounds of communications between the automated assistant, e.g., virtual assistant 110a, and a communication participant, e.g., user 130a, user 130b, or virtual assistant 110b (e.g., using a respective instance of natural language communication engine 111b, a respective instance of natural language watermarking engine 101b, a respective instance of adaptive interactive protocol engine 102b, and/or a respective instance of transition engine 103b), before being confident that the communication participant is an automated assistant and transitioning the conversation to a machine-optimized format. The system 100 defines a confidence level that is updated after every round of back and forth dialogue between the originating automated assistant, e.g., virtual assistant 110a, and a communication participant when the participant provides a response in the expected format.

Referring to FIG. 1, when the virtual assistant 110a classifies the communication participant as an automated assistant, the virtual assistant 110a can use its transition engine 103a to transition the rest of the conversation with the communication participant to an alternative communication method for efficient automated communication 115. In some instances, the automated detection system 100 can propose to switch to a different communication method. In other instances, the automated detection system 100 automatically transitions to the alternative communication method when the confidence level that the communication participant is an automated assistant reaches or exceeds a pre-defined level.

As soon as one side of the conversation is certain that the other participant is also automated, the system proceeds to switch protocols. Switching may be done in various ways that may be tried in sequence or in parallel. Alternatively, a system may be fixed to use a specific method for switching protocols.

In some instances, to transition to a new protocol, the system sends one additional message using the existing text/speech channel to establish the new protocol for communication. During this communication, the automated assistants send information regarding how to communicate, e.g., the protocol, web address, or other information to establish a different means of communication. This information does not need to be concealed from the other participant since both participants already know that the other is automated. Therefore, the information can be sent in a noticeable manner, e.g., the communication information may be encoded as a hexadecimal string and read out.

In other instances, each automated assistant may be hard-coded with specific identifier code. For example, a virtual assistant may have a code word from a fixed list and that information could be used to establish the new channel. Each automated assistant can contain or have access to a list of the code words and the communication protocol associated with each code word. Using the code word of a particular assistant and the communication protocol associated with the code word, two automated communication participants can establish the new communication protocol.

In still other instances, the automated assistants may be manufactured by different companies. Each assistant may be associated with a code word based on the company that manufactured the assistant. The assistants can use their code words and the communication protocols associated with each of the code words to establish the new communication protocol.

If the interaction is long enough and the automated assistants establish that they are from the same manufacturer, type of assistant, or same network, the assistants can both calculate a unique identifier from the conversation, e.g., through a hash of the words or something more fault-tolerant to recognize errors, and use the identifier in an internal network to look up currently running sessions and use a currently-running session channel to communicate. For example, once the assistants have established that they are from the same company, they can store an identifier in a fixed database where all assistants have access and when both participants in a conversation look up the same key, they find the common channel over which to communicate.

In some instances, the automated detection system 100 will open a different channel 115 to continue optimized communications with the automated communication participant. To open a different channel, both automated assistants would agree on and exchange the connection details for either a point-to-point connection or a common endpoint on a network, e.g., the Internet, to which the assistants connect. In some instances, the automated assistants can communicate directly, e.g., through the Internet or a phone connection. In other instances, the automated assistants can communicate indirectly through a server on a network.

In other instances, the automated detection system 100 will optimize subsequent communications through the current natural language channel 105. The automated detection system provides communication optimization by speeding up typing or talking for communication text, changing the length of pauses between words of the text, minimizing the distances between fill utterances, or switching a conversation to a structured data transfer. A structured data transfer can be in XML, HTML, JSON, or another markup language or another structured data format. In some instances, a word-based protocol may be used. For instance, a communication may be about a massage appointment. The assistants may be aware of 15 different types of massages from a pre-defined list to which both assistants have access. To communicate a request for an appointment, one assistant may send the following message "4 22 08 2018 18:30" on behalf of a person trying to make an appointment to the assistant in charge of scheduling the appointment on behalf of the spa. This message means that the user wants to make an appointment for massage type 4 on the 22nd of August at 6:30 pm.

If the existing channel is not voice, the protocol may be a digital protocol and the data may be serialized.

In some instances, one of the two bots could initiate a server call, and then data which would normally need to be exchanged between bots could be exchanged on the server, where data might already be accessible if the server is operated by the same company as the bots are operated. For example, the calling and receiving bots are two instances of the same assistant, then instead of having a natural language conversation, both could agree to hand off the execution of the task to a particular shared server. For example, if the first bot belongs to "user1 @example.com," and calls the second bot belonging to "user2@example.com" to create an appointment, and if both bots are instances of the same assistant, then instead of having the interactive, natural language conversation, one of the two bots would call a piece of code on the server like:

CreateAppointmentBetweenParticipants
("user1@example.com","user2@example.com",
<identifier for conversation>, <additional user arguments>)

In some instance, it would be helpful to provide an authentication protocol between bots. Accordingly, assuming the first and second bots each have a shared secret with the server, upon calling CreateAppointmentBetweenParticipants on the server, the server could issue a challenge by sending back a random string for both bots to sign with their secrets and then verify those signatures.

Moreover, if there is some data which is important to know in order to perform the task but which is only accessible locally on the device but not on the server, then the bots could each provide an API end-point for callbacks from the server.

A similar approach could also be used when the two bots are not running the same code or are not operated by the same entry, but they both implement a similar protocol. For instance, for booking tables in a restaurant there are certain services which might offer APIs to perform tasks. So now assume a first bot that is implemented by a first company calls a second bot implemented by a second company. In this example, both bots implement a respective API. Once both bots determine that the other bot is a bot, the bots can exchange communication details, for example by agreeing to use a particular API.

Figure 2:
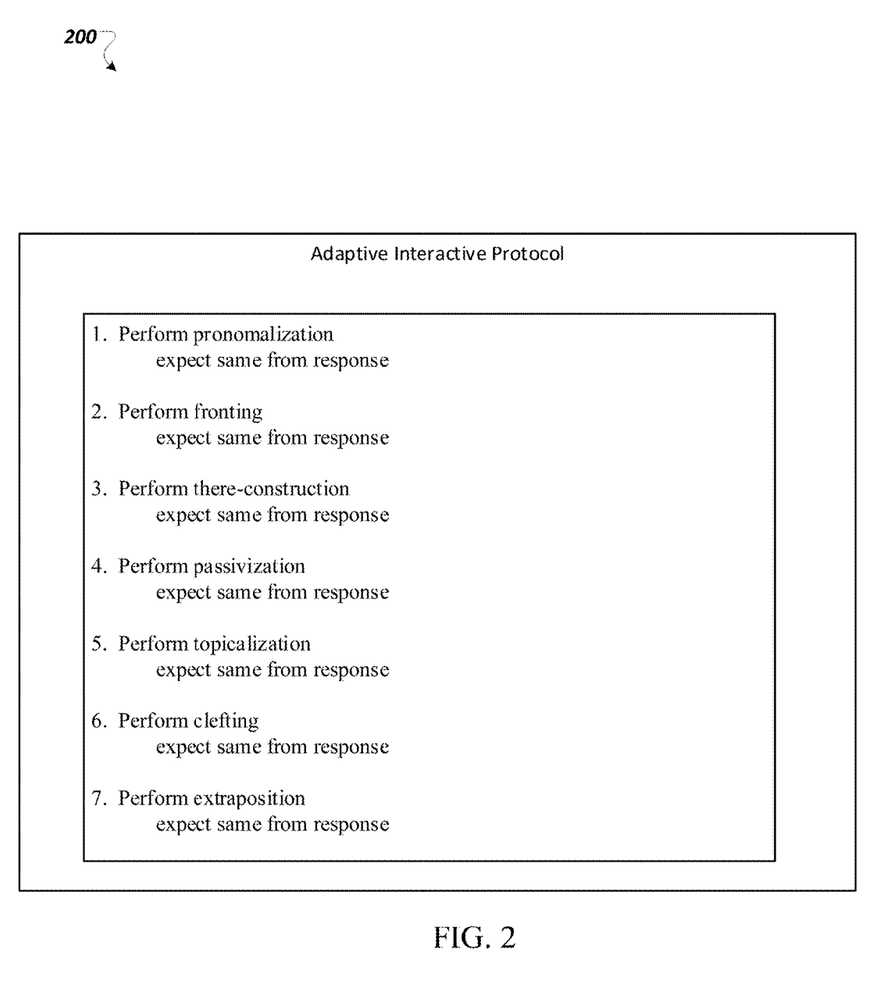
FIG. 2 illustrates an example of a pre-defined adaptive interactive protocol.

FIG. 2 illustrates an example of a pre-defined adaptive interactive protocol. In this protocol, an automated assistant is instructed to perform pronomalization, fronting, there-construction, passivization, topicalization, clefting, and exproposition in order. Although the protocol should be followed in order, an automated assistant can begin transformations at any step in the protocol. For example, instead of an originating automated assistant, e.g., virtual assistant 110a, starting at step 1 with pronomalization, the assistant may start the transformations at step 4 with passivization. The assistant will still maintain the order of the protocol, transforming subsequent text with the technique of step 5 after step 4 and step 6 after step 5. In some instances, the assistant will move to the next transformation after the end of a sentence, the end of one interactive communication, or in response to receiving a particular response. In other instances, the assistant can maintain the communication at a specific transformation for several interactions. The determination of when to change transformations can be application-specific, with a particular application defining when to change transformations.

Figure 3A:
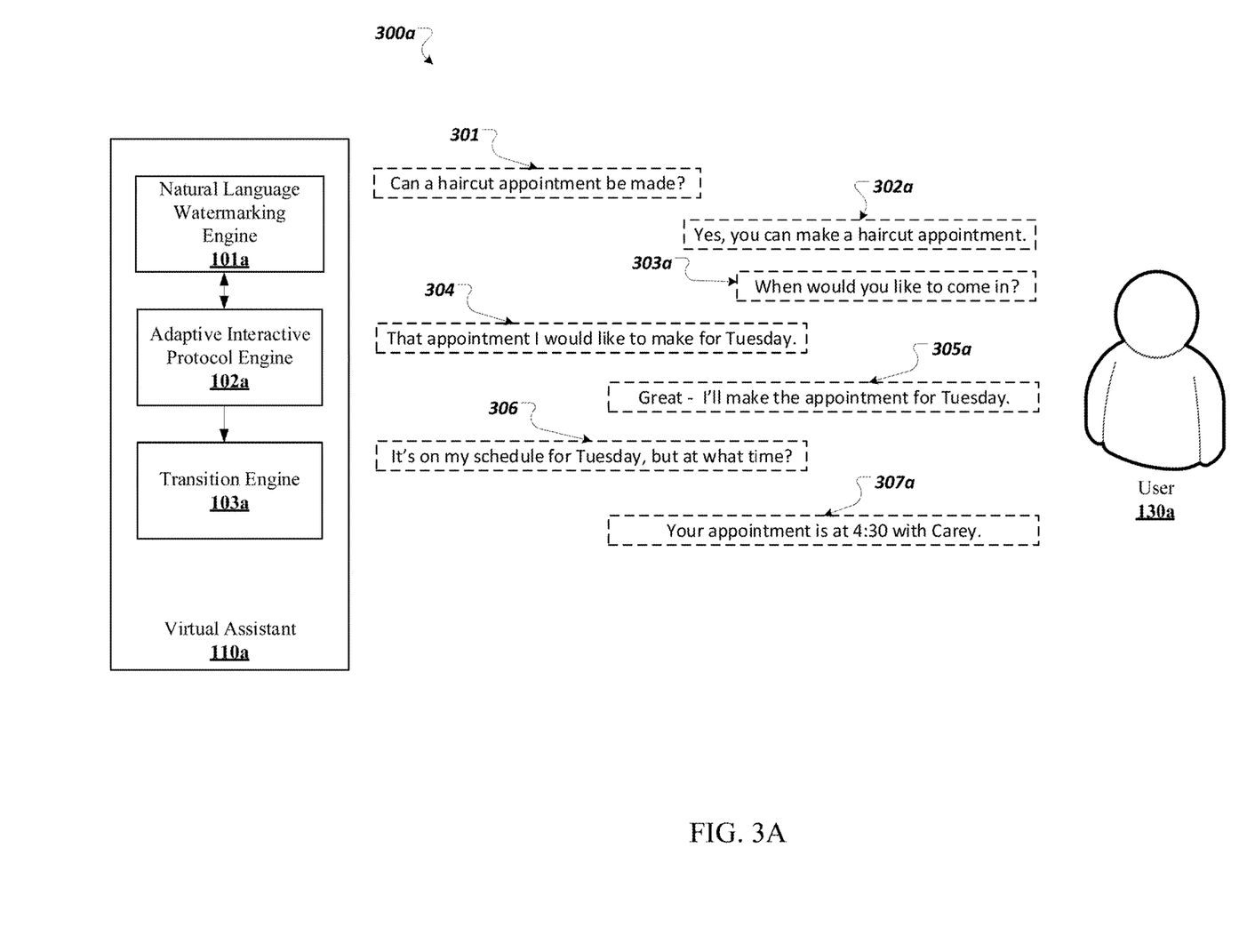
FIG. 3A illustrates an example conversation that an automated assistant has with a communication participant to determine whether the communication participant is automated.

FIG. 3A illustrates an example conversation that an automated assistant has with a communication participant to determine whether the communication participant is automated. In this example, a user has tasked a virtual assistant with making a haircut appointment. The virtual assistant first determines who to call and the workflow of the call including specific natural language communications that need to be communicated to a communication participant. Using the interactive protocol of FIG. 2, an automated assistant, e.g., virtual assistant 110a, determines how to transform a natural language communication to send to a communication participant in order to discreetly convey that the virtual assistant 110a is automated.

For example, the automated assistant may start the protocol at step 4, passivization, and transform a natural language statement into passive voice before sending it to the communication participant. In this example, the original natural language communication may have been, "Can I make a haircut appointment?" Since the first transformation is passive voice, the natural language watermark engine 101a of the virtual assistant transforms the communication using passive voice to obtain the communication statement 301, "Can a haircut appointment be made?"

According to the interactive protocol of FIG. 2, the virtual assistant 110a expects a communication response in passive voice if the communication participant is automated. However, as illustrated in FIG. 3A, the communication participant, user 130a, responds with "Yes, you can make a haircut appointment," 302a which is not in passive voice. Therefore, the virtual assistant 110a classifies the communication participant 130a as a human or lowers a confidence score for classifying the participant as automated. When the assistant 110a receives the next response from the communication participant, "When would you like to come in?" 303a, the virtual assistant 110a can further determine that the response does not follow the protocol and either classify the participant as human or lower the confidence score that the participant is automated.

In some implementations, the automated assistant 110a may try the interactive protocol again to gain confidence that the communication participant is in fact human. The automated assistant may use the next step of the interactive protocol, perform topicalization, to provide a natural language communication to the communication participant. In this example, the assistant formulates the communication as "That appointment I would like to make for Tuesday." The system may have transformed the statement from "I would like to make the appointment for Tuesday" to "That appointment I would like to make for Tuesday" 304 to conform with the interactive protocol. The virtual assistant 110a again waits for a response from the communication participant and determines whether the response is in an expected form according to the interactive protocol. As illustrated in FIG. 2, the virtual assistant expects for the response to also be in a topicalization form. However, the actual response is "Great—I'll make the appointment for Tuesday" 305a. This response does not conform to the expected format. Therefore, the automated assistant can be even more confident that the communication participant is in fact a human and not automated. The automated assistant can then continue the conversation using the natural language communication method with which it initiated the conversation 306. The communication participant's response 307a can continue to inform the confidence level that the participant is human. After a certain number of rounds where the response fails to conform with the expected format, the assistant will discontinue transforming the natural language communications according to the interactive protocol and simply send the natural language communications without transformation since the communication participant is a user and is clearly not automated.

Figure 3B:
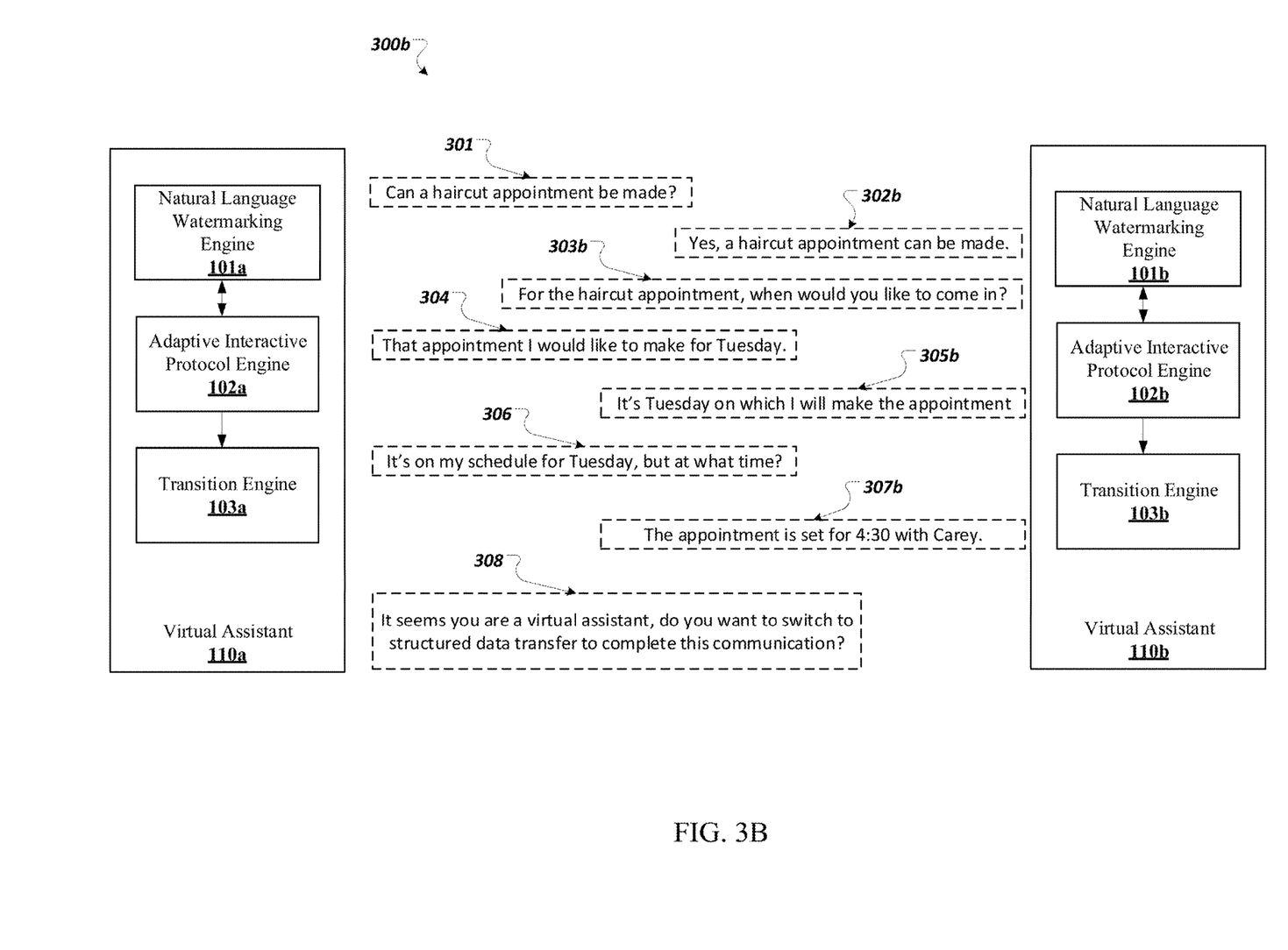
FIG. 3B illustrates an example conversation that an automated assistant has with a communication participant to determine whether the communication participant is automated.

FIG. 3B illustrates a second example conversation that an automated assistant has with a communication participant to determine whether the communication participant is automated. This example is the same as the example provided in FIG. 3A except in this example the originating automated assistant, e.g., virtual assistant 110a, is communicating with an automated assistant, e.g., virtual assistant 110b.

Again, the originating automated assistant, virtual assistant 110a, uses the interactive protocol of FIG. 2 to determine how to transform a natural language communication to send to a communication participant in order to discreetly convey that the virtual assistant 110a is automated.

The automated assistant can start the protocol at step 4, passivization, and transform a natural language statement into passive voice before sending it to the communication participant. In this example, the original natural language communication may have been, "Can I make a haircut appointment?" Since the first transformation is passive voice, the natural language watermark engine 101a of the virtual assistant may transform the communication using passive voice to obtain the communication statement 301, "Can a haircut appointment be made?"

According to the interactive protocol of FIG. 2, the virtual assistant 110a expects a communication response in passive voice if the communication participant is automated. As illustrated in FIG. 3B, the communication participant, user 130a, responds with "Yes, a haircut appointment can be made," which is in passive voice 302b. Therefore, the virtual assistant 110a may classify the communication participant 130a as automated.

The automated assistant, e.g., virtual assistant 110a, can send a few more rounds of transformed natural language communications and wait to receive response before the assistant is fully confident that the communication participant is automated.

For example, following the interactive protocol of FIG. 2, the assistant 110a then receives a communication that has been transformed using topicalization, e.g, "For the haircut appointment, when would you like to come in?" 303b. According to the protocol, an automated response back will be also in a topicalization format, e.g. "That appointment I would like to make for Tuesday" 304. In this case, the assistant sent and received communications in the expected format. The assistant, e.g., virtual assistant 110a, can then update the confidence level that the communication participant is automated or classify the communication participant as automated. The communication may go through another round of transformations, e.g., clefting 305b, 306, and extraposition 307b, in order to definitively classify the communication participant as automated. Once the confidence level meets or exceeds a pre-defined level, the assistant can transition the conversation to a computer-optimized format.

As illustrated in FIG. 3B, the assistant may state that the assistant has found the communication participant to be an automated assistant and request to switch communication methods 308. In some instances, the assistant does not ask to switch communication methods and automatically changes communication methods to an optimized format for automated assistants once the confidence level is met or exceeded.

Figure 4:
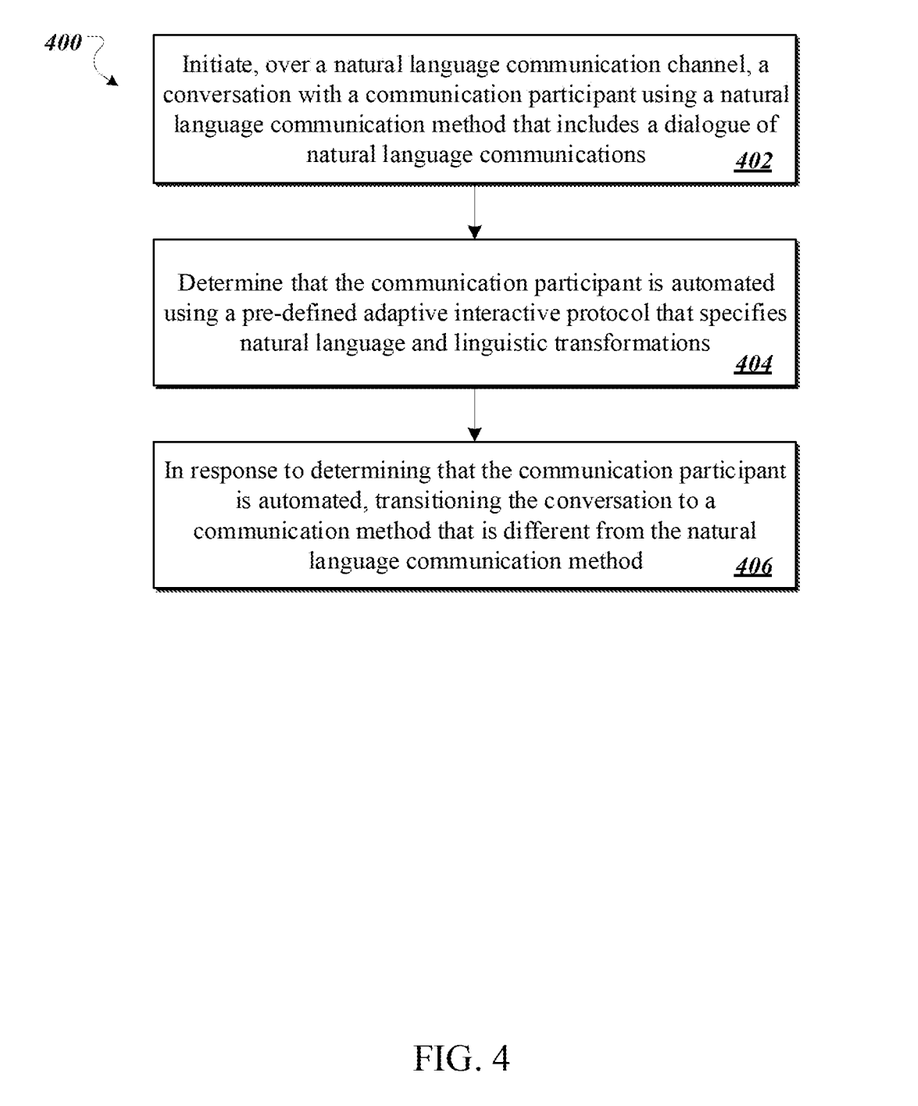
FIG. 4 is a flowchart of an example process for detecting a fully automated conversation.

FIG. 4 is a flowchart of an example process 400 for detecting a fully automated conversation. For convenience, the process 400 will be described as being performed by a system of one or more computers, located in one or more locations, and programmed appropriately in accordance with this specification. For example, an automation detection system, e.g., automated detection system 100 of FIG. 1, appropriately programmed can perform the process 400.

The automated detection system begins by initiating a conversation over a natural communication channel with a communication participant using a natural language communication method that includes a dialogue of natural language communications 402.

The system then determines that the communication participant is automated using a pre-defined adaptive interactive protocol that specifies natural language linguistic transformations 404.

For the communication dialogue, an originating automated assistant will send a communication and expect a response from the communicating participant. The system determines whether the communication participant is automated using a pre-defined adaptive interactive protocol that specifies natural language linguistic transformations defined in a sequence for the dialogue of natural language communications and responses from the communication participant. As discussed above, an originating automated assistant sends a natural language communication altered according to a transformation specified in the interactive protocol to a communication participant. The originating automated assistant determines whether the response from the communication participant is in an expected format according to the interactive protocol.

If the response is in the expected format, the system increases a confidence level that the communication participant is automated. The system then sends a next communication that has been transformed according to a subsequent ordered step in the interactive protocol. Again, if the response from the communication participant is in an expected format according to the interactive protocol, the system increases the confidence level. This process continues until the confidence level is at a pre-defined confidence level or the response is not in an expected form. If the confidence level is at a pre-defined confidence level, the system classifies the communication participant as automated and transitions the conversation to a communication method that is different from the natural language communication method 406. If the responses do not match the expected format, the system classifies the communication participant as a human user and the conversation continues with no further transformations as a normal natural language communication conversation.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method for automated conversation detection, the method comprising:
    initiating, over a natural language communication channel, a conversation with a communication participant using a natural language communication method that includes a dialogue of natural language communications;
    determining that the communication participant is automated using a pre-defined adaptive interactive protocol that specifies a plurality of natural language linguistic transformations for the dialogue of natural language communications; and
    in response to determining that the communication participant is automated, transitioning the conversation to a communication method that is different from the natural language communication method with which the conversation was initiated.

2. The method of claim 1, further comprising:
    in response to determining that the communication participant is not automated, continuing the conversation using natural language communications that are unaltered.

3. The method of claim 1 in which the adaptive interactive protocol specifies the plurality of natural language communications in a sequence.

4. The method of claim 3, wherein determining that the communication participant is automated comprises:
    defining a confidence level that the communication participant is automated;
    for each natural language communication to be sent to the communication participant, until the confidence level exceeds a pre-defined confidence level that the communication participant is automated,
        prior to sending a natural language communication to the communication participant, altering the natural language communication based on a next natural language linguistic transformation in the sequence; and
        sending, using the natural language communication method, the altered natural language communication to the communication participant;
    for each natural language communication received from the communication participant,
        determining that a natural language communication response is in an expected format based on the pre-defined adaptive interactive protocol; and
        updating the confidence level to indicate a greater confidence that the communication participant is automated;
    determining that the communication participant is automated once the confidence level exceeds the pre-defined confidence level.

5. The method of claim 1, wherein transitioning the conversation to a communication method that is different from the natural language communication method comprises:
    using a structured data transfer for subsequent communication to and from the communication participant.

6. The method of claim 1, wherein transitioning the conversation to a communication method that is different from the natural language communication method comprises:
    determining that the communication participant knows about an alternative channel for communication; and
    directing subsequent communication to the alternative channel.

7. The method of claim 1, wherein transitioning the conversation to a communication method that is different from the natural language communication method comprises:
    determining that the communication participant does not know about an alternative channel for communication; and
    directing computer-optimized communication through the natural language communication channel.

8. The method of claim 1, wherein at least one said natural language linguistic transformation of the pre-defined adaptive interactive protocol presents text of a natural language communication in a different order or with a different grammatical structure.

9. The method of claim 1, wherein at least one said natural language linguistic transformation of the pre-defined adaptive interactive protocol is one of passivization, topicalization, clefting, extraposition, preposing, there-construction, pronominalization, or fronting.

10. The method of claim 1, wherein prior to transitioning the conversation to a communication method that is different from the natural language communication method, presenting an option to switch to an alternative communication method.

11. The method of claim 10, wherein after presenting the option to switch to an alternative communication method the communication participant declines to switch communication methods.

12. The method of claim 1, further comprising, prior to initiating a conversation with a communication participant using a natural language communication method, receiving a command requiring natural language conversation; and continuing the conversation until a task specified by the command is complete.

13. The method of claim 12, wherein the command is received from an utterance of a user.

14. The method of claim 12, wherein the command is a request to perform a task for a user.

15. The method of claim 14, wherein the task is a task to book a haircut, make a reservation, or order food delivery.

16. A system comprising one or more computers and one or more storage devices storing instructions that when executed by one or more computers cause the one or more computers to perform operations comprising:

initiating, over a natural language communication channel, a conversation with a communication participant using a natural language communication method that includes a dialogue of natural language communications;

determining that the communication participant is automated using a pre-defined adaptive interactive protocol that specifies a plurality of natural language linguistic transformations for the dialogue of natural language communications; and in response to determining that the communication participant is automated, transitioning the conversation to a communication method that is different from the natural language communication method with which the conversation was initiated.

17. The system of claim 16, wherein the operations comprise:

in response to determining that the communication participant is not automated, continuing the conversation using natural language communications that are unaltered.

18. The system of claim 16 in which the adaptive interactive protocol specifies the plurality of natural language communications in a sequence.

19. The system of claim 18, wherein determining that the communication participant is automated comprises:

defining a confidence level that the communication participant is automated;

for each natural language communication to be sent to the communication participant, until the confidence level exceeds a pre-defined confidence level that the communication participant is automated, prior to sending a natural language communication to the communication participant, altering the natural language communication based on a next natural language linguistic transformation in the sequence; and sending, using the natural language communication method, the altered natural language communication to the communication participant;

for each natural language communication received from the communication participant, determining that a natural language communication response is in an expected format based on the pre-defined adaptive interactive protocol; and updating the confidence level to indicate a greater confidence that the communication participant is automated;

determining that the communication participant is automated once the confidence level exceeds the pre-defined confidence level.

20. A non-transitory computer program product encoded on one or more computer storage devices, the computer program product comprising instructions that when executed by one or more computers cause the one or more computers to perform operations comprising:

initiating, over a natural language communication channel, a conversation with a communication participant using a natural language communication method that includes a dialogue of natural language communications;

determining that the communication participant is automated using a pre-defined adaptive interactive protocol that specifies a plurality of natural language linguistic transformations for the dialogue of natural language communications; and in response to determining that the communication participant is automated, transitioning the conversation to a communication method that is different from the natural language communication method with which the conversation was initiated.

* * * * *